US006996072B1

(12) United States Patent
Minborg

(10) Patent No.: US 6,996,072 B1
(45) Date of Patent: Feb. 7, 2006

(54) METHOD AND APPARATUS FOR EXCHANGE OF INFORMATION IN A COMMUNICATION NETWORK

(75) Inventor: Per Ake Minborg, Stora Hoga (SE)

(73) Assignee: The Phonepages of Sweden AB, (SE)

( * ) Notice: Subject to any disclaimer, the term of this patent is extended or adjusted under 35 U.S.C. 154(b) by 876 days.

(21) Appl. No.: 09/644,307

(22) Filed: Aug. 23, 2000

Related U.S. Application Data

(60) Provisional application No. 60/176,806, filed on Jan. 19, 2000.

(51) Int. Cl.
*H04L 12/66* (2006.01)
*H04L 29/00* (2006.01)
*H04M 1/00* (2006.01)
*H04Q 7/00* (2006.01)

(52) U.S. Cl. ...................... 370/260; 370/338; 370/352; 370/401; 379/88.17; 379/93.21; 379/93.23; 380/43; 380/270; 455/416; 455/445; 455/466

(58) Field of Classification Search ................ 370/252, 370/259, 260, 328, 329, 338, 352, 357, 389, 370/401, 465–467; 379/88.13, 88.17, 88.22, 379/93.01, 93.07, 93.15, 93.21, 93.23, 201.01, 379/201.06, 201.08, 201.09, 202.01, 220.01, 379/221.14, 265.01, 265.02, 265.09; 345/330, 345/335, 433; 455/413, 416, 422, 445, 450, 455/466; 380/33, 42, 43, 210, 230, 255, 380/257, 269, 270; 709/203, 219, 249, 313, 709/315

See application file for complete search history.

(56) References Cited

U.S. PATENT DOCUMENTS

| | | | |
|---|---|---|---|
| 5,157,710 | A | 10/1992 | Itoh |
| 5,329,591 | A | 7/1994 | Magrill |
| 5,398,279 | A | 3/1995 | Frain |
| 5,561,704 | A | 10/1996 | Salimando |
| 5,588,042 | A | 12/1996 | Comer |
| 5,613,205 | A | 3/1997 | Dufour |
| 5,633,922 | A | 5/1997 | August et al. |
| 5,689,563 | A | 11/1997 | Brown et al. |
| 5,712,979 | A | 1/1998 | Graber et al. |
| 5,761,279 | A | 6/1998 | Bierman et al. |
| 5,812,667 | A | 9/1998 | Miki et al. |
| 5,812,950 | A | 9/1998 | Tom |

(Continued)

FOREIGN PATENT DOCUMENTS

DE 19737126 3/1999

(Continued)

OTHER PUBLICATIONS

Lawrence Harte et al., GSM Superphones, Table of Contents and Chapter 1, pp. xi-xxii and 1-22, McGraw-Hill, 1999.

(Continued)

*Primary Examiner*—Alpus H. Hsu
(74) *Attorney, Agent, or Firm*—Hunton & Williams LLP

(57) ABSTRACT

A technique for connecting a dialed B-party number to a data object is described. The connecting of a B-party number to a specific data object, hereafter referred to as phonepage, will allow an A-party direct access to information that a B-party wishes to display to a calling party. The phonepage resides in a memory in a telecommunications network, or in a memory in a data-communications network connected thereto. The phonepage may have a similar appearance to an Internet web page, but may also take other appearances. The displaying of tile phonepage may be made dependent upon the capabilities of the A-party user equipment.

125 Claims, 12 Drawing Sheets

U.S. PATENT DOCUMENTS

| | | | |
|---|---|---|---|
| 5,850,433 | A | 12/1998 | Rondeau |
| 5,854,976 | A | 12/1998 | Aguilera et al. |
| 5,878,347 | A | 3/1999 | Joensuu et al. |
| 5,889,861 | A | 3/1999 | Ohashi et al. |
| 5,893,031 | A | 4/1999 | Hoogerwerf et al. |
| 5,895,471 | A | 4/1999 | King et al. |
| 5,901,352 | A | 5/1999 | St-Pierre et al. |
| 5,920,815 | A | 7/1999 | Akhavan |
| 5,930,699 | A | 7/1999 | Bhatia |
| 5,930,703 | A | 7/1999 | Cairns |
| 5,933,486 | A | 8/1999 | Norby et al. |
| 5,940,598 | A | 8/1999 | Srauss et al. |
| 5,946,684 | A | 8/1999 | Lund |
| 5,948,066 | A | 9/1999 | Whalen et al. |
| 5,950,121 | A | 9/1999 | Kaminsky et al. |
| 5,950,137 | A | 9/1999 | Kim |
| 5,952,969 | A | 9/1999 | Hagermann et al. |
| 5,963,626 | A | 10/1999 | Nabkel |
| 5,970,414 | A | 10/1999 | Bi et al. |
| 5,999,806 | A | 12/1999 | Kaplan et al. |
| 6,002,749 | A | 12/1999 | Hansen et al. |
| 6,005,870 | A | 12/1999 | Leung et al. |
| 6,006,097 | A | 12/1999 | Hörnfeldt et al. |
| 6,009,091 | A | 12/1999 | Stewart et al. |
| 6,014,090 | A | 1/2000 | Rosen et al. |
| 6,016,349 | A | 1/2000 | Musa |
| 6,031,836 | A | 2/2000 | Haserodt |
| 6,047,174 | A | 4/2000 | Frederick |
| 6,049,713 | A | 4/2000 | Tran et al. |
| 6,058,301 | A | 5/2000 | Daniels |
| 6,058,310 | A | 5/2000 | Tokuyoshi |
| 6,064,887 | A | 5/2000 | Kallioniemi et al. |
| 6,067,546 | A | 5/2000 | Lund |
| 6,072,875 | A | 6/2000 | Tsudik |
| 6,075,993 | A | 6/2000 | Kawamoto |
| 6,081,705 | A | 6/2000 | Houde et al. |
| 6,088,587 | A | 7/2000 | Abbadessa |
| 6,088,598 | A | 7/2000 | Marsolais |
| 6,091,808 | A | 7/2000 | Wood et al. |
| 6,091,945 | A | 7/2000 | Oka |
| 6,091,946 | A | 7/2000 | Ahvenainen |
| 6,094,168 | A | 7/2000 | Duffett-Smith et al. |
| 6,097,793 | A | 8/2000 | Jändel |
| 6,097,942 | A | 8/2000 | Laiho |
| 6,112,078 | A | 8/2000 | Sormunen et al. |
| 6,115,754 | A | 9/2000 | Landgren |
| 6,134,450 | A | 10/2000 | Nordeman |
| 6,138,158 | A | 10/2000 | Boyle et al. |
| 6,141,413 | A | 10/2000 | Waldner et al. |
| 6,154,646 | A | 11/2000 | Tran et al. |
| 6,157,708 | A * | 12/2000 | Gordon ................. 379/207.02 |
| 6,157,841 | A | 12/2000 | Bolduc et al. |
| 6,161,008 | A | 12/2000 | Lee et al. |
| 6,161,134 | A * | 12/2000 | Wang et al. ................ 709/220 |
| 6,163,598 | A | 12/2000 | Moore |
| 6,169,897 | B1 | 1/2001 | Kariya |
| 6,173,316 | B1 | 1/2001 | De Boor et al. |
| 6,181,928 | B1 | 1/2001 | Moon |
| 6,181,935 | B1 | 1/2001 | Gossman et al. |
| 6,185,184 | B1 | 2/2001 | Mattaway et al. |
| 6,192,123 | B1 * | 2/2001 | Grunsted et al. ........... 379/350 |
| 6,192,251 | B1 | 2/2001 | Jyogataki et al. |
| 6,192,258 | B1 | 2/2001 | Kamada et al. |
| 6,199,099 | B1 | 3/2001 | Gershman et al. |
| 6,202,023 | B1 | 3/2001 | Hancock et al. |
| 6,205,204 | B1 | 3/2001 | Morganstein et al. |
| 6,208,659 | B1 | 3/2001 | Govindarajan et al. |
| 6,215,790 | B1 | 4/2001 | Voit et al. |
| 6,219,694 | B1 | 4/2001 | Lazaridis et al. |
| 6,219,696 | B1 | 4/2001 | Wynblatt et al. |
| 6,226,367 | B1 | 5/2001 | Smith et al. |
| 6,226,668 | B1 | 5/2001 | Silverman |
| 6,233,608 | B1 | 5/2001 | Laursen et al. |
| 6,243,443 | B1 | 6/2001 | Low et al. |
| 6,253,234 | B1 * | 6/2001 | Hunt et al. ................. 709/213 |
| 6,301,609 | B1 | 10/2001 | Aravamudan et al. |
| 6,356,956 | B1 | 3/2002 | Deo et al. |
| 6,469,998 | B1 | 10/2002 | Burgaleta Salinas et al. |
| 6,507,908 | B1 | 1/2003 | Caronni |
| 6,522,875 | B1 | 2/2003 | Dowling et al. |
| 6,549,773 | B1 | 4/2003 | Linden et al. |
| 6,625,644 | B1 | 9/2003 | Zaras et al. |
| 6,640,240 | B1 * | 10/2003 | Hoffman et al. ............ 709/203 |
| 6,687,340 | B1 | 2/2004 | Goldberg et al. |
| 6,744,759 | B1 | 6/2004 | Sidhu et al. |
| 2002/0059272 | A1 | 5/2002 | Porter |
| 2002/0128002 | A1 | 9/2002 | Vu |
| 2003/0050052 | A1 | 3/2003 | Minborg et al. |
| 2003/0060211 | A1 | 3/2003 | Chem et al. |

FOREIGN PATENT DOCUMENTS

| | | |
|---|---|---|
| EP | 0484067 | 5/1992 |
| EP | 0 853 287 A2 | 7/1998 |
| EP | 0851647 | 7/1998 |
| EP | 0858202 | 8/1998 |
| EP | 0 869 688 A2 | 10/1998 |
| EP | 0869688 | 10/1998 |
| EP | 0944203 | 9/1999 |
| EP | 0 971 513 A2 | 1/2000 |
| EP | 1069789 | 1/2001 |
| EP | 1089519 | 4/2001 |
| GB | 23338150 | 8/1999 |
| WO | 94/23523 | 10/1994 |
| WO | WO 97/07644 | 2/1997 |
| WO | WO 97/13380 | 4/1997 |
| WO | WO 97/20441 | 6/1997 |
| WO | WO 97/22211 | 6/1997 |
| WO | WO 97/22212 | 6/1997 |
| WO | 97/31490 | 8/1997 |
| WO | 97/31491 | 8/1997 |
| WO | WO 97/31491 | 8/1997 |
| WO | 98/11744 | 3/1998 |
| WO | 98/18283 | 4/1998 |
| WO | 98/19445 | 5/1998 |
| WO | WO 98/51056 | 11/1998 |
| WO | WO 98/51056 A2 | 11/1998 |
| WO | 98/56197 | 12/1998 |
| WO | WO 98/56159 A1 | 12/1998 |
| WO | 99/00751 | 1/1999 |
| WO | WO 99/00751 | 1/1999 |
| WO | WO 99/11078 | 3/1999 |
| WO | 99/35595 | 7/1999 |
| WO | WO 00/04730 | 1/2000 |
| WO | WO 00/38458 | 6/2000 |
| WO | 00/39666 | 7/2000 |
| WO | 00/46697 | 8/2000 |
| WO | 00/78016 | 12/2000 |
| WO | WO 00/77662 | 12/2000 |
| WO | 01/20475 | 3/2001 |
| WO | 01/01077 | 1/2002 |

OTHER PUBLICATIONS

Christian Bettstetter et al., "GSM Phase 2+ General Packet Radio Service GPRS: Architecture, Protocols, and Air Interface," IEEE Communications Surveys, <<http://www.comsoc.org/pubs/surveys>>, 13 pages, Third Quarter 1999, vol. 2, No. 3.

Smart Messaging Specification, Revision 2.0.0, Nokia Mobile Phones Ltd., May 17, 1999.

Digital Cellular Telecommunications System (Phase 2); Technical Realization of the Short Message Service (SMS)

Point-to-Point (GSM 03.40), ETSI, ETS 300 536, Fourth Edition, Oct. 1996.
Commonly Assigned U.S. Appl. No. 09/686,990, entitled "Exchange of Information in a Communication System," filed on Oct. 17, 2000 (and currently copending herewith).
International Search Report for PCT/SE00/01689, issued Dec. 8, 2000, four pages.
Schulzrinne, "A Comprehensive Multimedia Control Architecture for the Internet," Dept. of Computer Science, Columbia University, New York, NY, IEEE No. 0-7803-3799-9/97, 1997, pp. 65-76.
Schulzrinne and Rosenberg, "Signaling for Internet Telephony," Columbia University and Bell Laboratories, respectively, ten pages.
Dalgic et al., "True Number Portability and Advanced Call Screening in a SIP-Based IP Telephony System," IEEE Communications Magazine, Jul. 1999, pp. 96-101.
PCT-International Search Report for PCT/SE01/00071.
PCT-International Search Report for PCT/SE01/00080.
ETSI TS 101 267 (V.8.5.0) Technical Specification for Digital telecommunications system (Phase 2+); Specification of the SIM Application Toolkit for the Subscriber Identity Module—Mobile Equipment (SIM—ME) interface) (Global System for Mobile Communications: 1999).
PCT-International Search Report dated Jun. 13, 2001, for Application No. PCT/SE01/00079, Filed Jan. 18, 2001.
PCT-International Search Report dated Jun. 13, 2001 for Application No. PCT/SE01/00094, Filed Jan. 19, 2001.
PCT-International Search Report dated Jul. 06,2001, for Application No. PCT/SE01/00093, Filed Jan. 19, 2001.

* cited by examiner

METHOD AND APPARATUS FOR EXCHANGE OF INFORMATION IN A COMMUNICATION NETWORK

This appln. claims benefit of 60/176,806 filed Jan. 19, 2000.

BACKGROUND

The present invention relates generally to a method and apparatus for exchanging information in a communication system. More specifically the invention relates to a communication system, which connects to a private or public data communication network and to a public or private telecommunication network.

The present evolution of data-communication is such that more and more users gain access to the Internet worldwide. The Internet has become both a source of knowledge but also a marketplace for business, arid it is attracting more and more users. Currently there is a high pressure on the data-communications industry to provide solutions that allow everyone to gain access to Internet. Broadband solutions are continuously developed and both local as well as national access networks are planned and launched. The presently most common method of modem access through the telecommunications network (e.g., the Public Switched Telecommunication Network PSTN provider) is being replaced by other ways of access with a possibility to higher data rates, e.g., through electric power and cable TV providers.

At the same time, the telecommunications industry is struggling another battle; that of providing mobility to each and every user. Traditionally, telecommunication has been focused on voice communication. With the increase of data communication however, other demands are arising (e.g., higher data rate transfer), but also new possibilities. Evolutions of mobile systems are presently in a period when more and more packet-based systems will be deployed. Packet switched Systems have, in contrast to circuit switched systems, certain advantages when it comes to transfer of data-communication. In a packet switched system, a user is only utilizing a transmission resource when system control signaling or user information is transmitted. In a circuit switched system, a user is allocated a transmission resource continuously, even though no current transfer is active. Circuit switched systems have some obvious advantages in real-time voice communication, since it is difficult to predict the communication. For data-communication, it is not as important to predict the transmission resources required, since the demands on delay and delay variations are not as crucial to the communication quality as for voice. It is therefore possible to allow more users onto the transmission resources by allowing usage thereof only when there is something to transmit and leave the channel available for additional users otherwise.

One such system is the packet data evolution of the mobile communication system pursuant to the ETSI GSM specification, called General Packet Radio Service (GPRS). With GPRS, higher bit rates and more users may be allowed than what is possible today, when data communication is deployed on a circuit switched channel. GPRS is a step towards mobility for data communication users, in contrast to GSM, which is optimized for mobility for "traditional" telecommunication users, i.e., real-time voice communication users.

The data-communication run over the telecommunications networks today is usually initiated by an access to an Internet- or a mail server. A user logs on to a distant server arid accesses the data-communications network through, e.g., modem pools. The user dials up the modem pool and is therefrom connected to a server, from which access can be made to both local as well as global networks. Browsers like, e.g., Microsoft Explorer or Netscape Navigator are used to navigate on the Internet and switch between Internet pages or addresses. Users and institutions usually design their own data objects, or homepages, on an internal or external network that provides personal information or any other kind of information. Once connected to the data network a user may access these data objects by entering the correct address. The address is often selected by combining a node name in the network (e.g., server name) and an arbitrary text-string. Typically, it is not trivial to find a desired data object, since the text strings and server names are not obvious.

Addressing in a telecommunications network, e.g., when engaging in a voice communication, is usually performed by entering a telephone number on a User Equipment (UE), like a mobile telephone. A telephone number is a world-wide, unique addressing string. A calling party (A-party) dials the addressing string (B-number) to the called party (B-party). Dependent on what type of network the A-party is a Subscriber on, the call request is routed through one or several Public telecommunication networks to the correct addressee and the communication may begin.

The above principle also applies when a user wishes to connect to the Internet from a computer connected to a telecommunications network. The user connects to a data-communications network by dialing a B-number to a modem pool, from which accessing the data-communications network is possible. There are no information or interaction possibilities with the called server other than this access opportunity.

Applicants have identified that there is a problem in the present way of accessing the Internet for specific data objects because of the non-obvious way of addressing data objects. There is further a need in the telecommunications industry to provide a simpler way of accessing the Internet and to guide a user by other means than a modem number to call, from where the user is left on her own to be further guided to the desired homepage or data object.

SUMMARY

The present invention overcomes the above identified deficiencies of identifying and finding a data object and navigating between a set of data objects by applying a novel connection between a data-communications network and a telecommunications network.

In one aspect of the present invention a technique for connecting a dialed B-party number to a data object is described. The connecting of a B-party number to a specific data object, hereafter referred to as phonepage, will allow an A-party direct access to information that a B-party wishes to display to a calling party. The phonepage resides in a memory in a telecommunications network, or in a memory in a data-communications network connected thereto. The phonepage may have a similar appearance to an Internet web page but may also take other appearances. The displaying of the phonepage may be made dependent upon the capabilities of the A-party user equipment.

Dependent on the type of equipment used by the A-party, the node storing the phonepages may, upon detection of type of equipment, select the most advantageous way of displaying a selected data object.

Also, dependent on the A-party user equipment, the phonepage may provide different levels of interaction possibilities, i.e., only display information, or be a fully interactive data object with a duplex communication between the A-party and the node housing the memory in which the phonepage is stored.

The phonepages may be configured to be displayed automatically or by indication from the A-party. In a variant of the invention also a B-party has the same capabilities of obtaining phonepages upon reception of an A-number in conjunction with an incoming call.

In another aspect of the present invention, a node in a data-communication or telecommunication system is described. The node consists of at least a data base memory including at least indications of the phonepages and upon access from a remote request, respond with said indication.

The transfer of the indication to a calling A-party may be dependent on type of connection and access technology used in the connection. For example in a connection where both circuit switched and packet switched communication is simultaneously possible, the indication may be transferred on a packet switched communication resource and, e.g., voice communication may be initiated on the circuit switched communication resource. In other types of connections, two data flows may be set-up on one or several simultaneous packet switched communication resources, e.g., speech and data transfer. Another example is when voice communication is initiated over a circuit switched communication resource and the phonepage indications are transferred over a packet switched channel with limited performance such as an SMS channel.

BRIEF DESCRIPTION OF THE DRAWINGS

The invention will now be more thoroughly described and features and advantages will become readily apparent by reading the following detailed description, where references will be made to the accompanying figures, where.

DETAILED DESCRIPTION

The present invention will now be described with references to a telecommunications system based on GSM as a circuit switched communication system and GPRS as a packet switched communications system. It should however be noted that the embodiments described are to be considered exemplary and that other packet and circuit switched systems may equally well be considered, both fixed—as well as mobile—and with any access technology, e.g., Time Division Multiple Access (TDMA), Code Division Multiple Access (CDMA), Frequency Division Multiple Access (FDMA), Orthogonal Frequency Division Multiple Access (OFDMA), Time Division Duplex (TDD), Frequency Division Duplex (FDD) or any combinations thereof. The invention is not restricted to any specific type of communications network or access technology.

Figure 1:
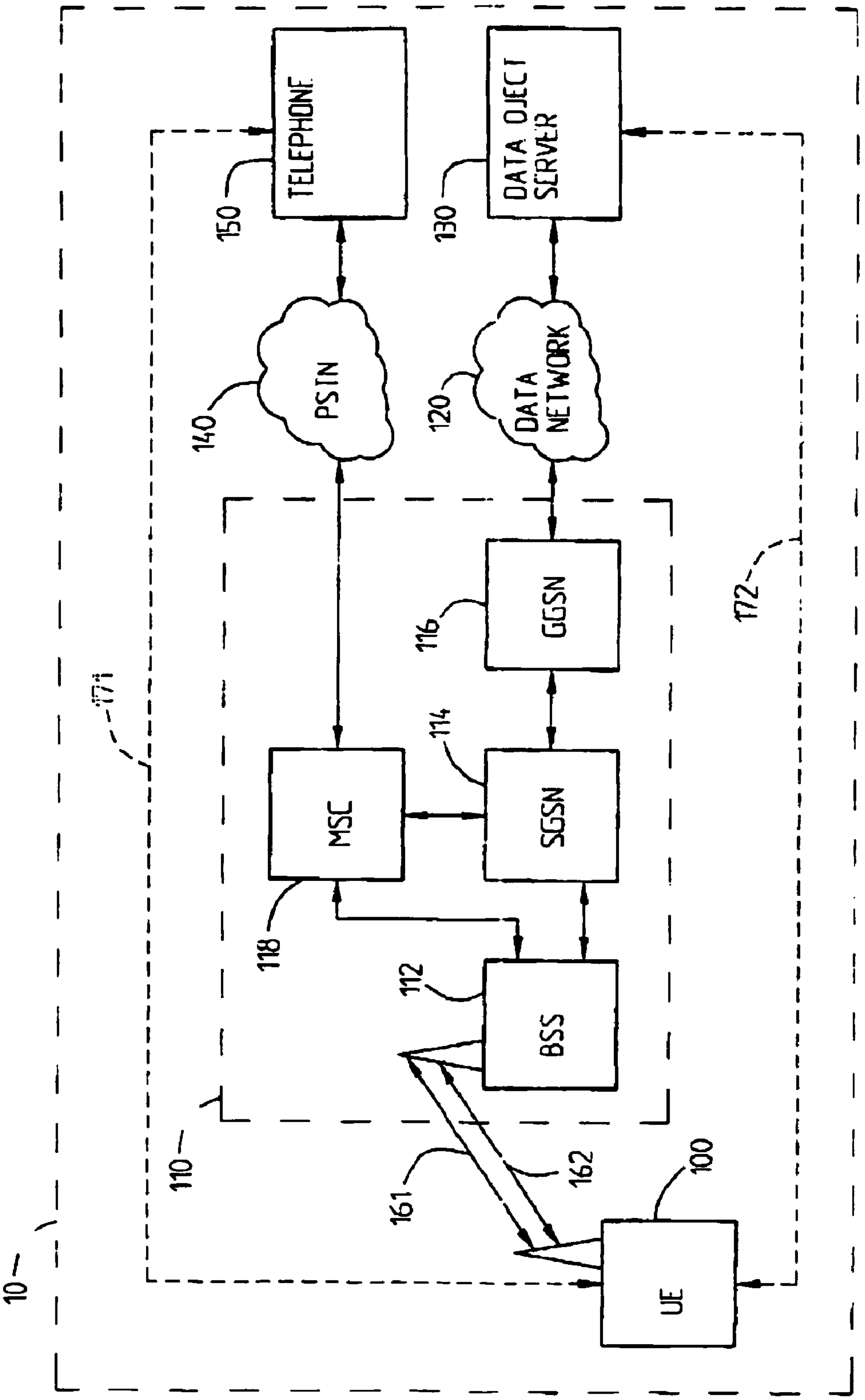
FIG. 1 illustrates an overview of a communication infrastructure overview according to one embodiment of the invention.

FIG. 1 illustrates a communication infrastructure overview, 10, where a number of different communication networks are interconnected. FIG. 1 includes both nodes included in a Circuit Switched (CS) mobile communication network, e.g., a Mobile Switching Center (MSC), 118, and Base Station Subsystem (BSS), 112, as well as nodes included in a Packet Switched (PS) mobile communication network, e.g., Serving GPRS Support Node (SGSN), 114 and a Gateway GPRS Support Node (GCSN), 116. Typically the SGSN includes functionality such as re-segmenting data packets according to one protocol into data packets according to protocols used over the air interface. The SGSN also includes control mechanisms for one or several BSS, 112 as well as Quality of Service (QoS) mechanisms. The GCSN includes functionality required to maintain communication between a mobile packet data network and other packet data networks, e.g., data network 120. The CS part of the network connects to a PSTN network, 140, and the PS part of the network connects to a data network, 120. The data network may be both an external or internal network, i.e., with global or limited access possibilities. As shown, the PS and CS parts of the network may also be interconnected by way of an interface between the MSC, 118 and the SGSN, 114. The BSS, 112, may serve both the PS as well as the CS part of the network with packet switched (161) as well as circuit switched (162) communication resources over the air, to provide mobility to both PS and CS service users and their User Equipment (UE), 100. The UE, 100, may for example be a mobile telephone or a mobile telephone connected to any kind of data equipment, e.g., Personal Digital Assistance Devices (PDA) or Laptop computer. The PSTN, 140, provide users (user devices) connected to the fixed network with service, e.g., to "plain old telephones" (POTs), facsimile- or data modem devices, 150. Other examples of devices connected directly or indirectly to the PSTN, 140, are ISDN terminals and communication devices connected via a Digital Subscriber line (DSL) (e.g., ADSL, HDSL and XDSL).

The data network, 120, typically includes one or several routers (not illustrated) and data bridges such that several nodes may be interconnected and communicate with each other. The data network used in connection with the present invention also includes a data object server, 130. Typically, pluralities of data object servers are included in a data network, although, for reasons of explanation and clarity, only one data object server, 130, is illustrated in FIG. 1. Examples of data networks are Internet and Intranet networks. The UE, 100, may obtain a complete logical connection 171 to an indicated B-party telephone, 150, connected to the PSTN, 140, through the CS communication channel, 162, provided between the UE, 100, and the BSS, 112, and further via the MSC node, 118, over which conversation may be conducted between either party UE 100 and telephone 150. Similarly, the UE 100, may obtain a complete logical connection 172 to equipment, e.g., data object server, 130, connected to the data network, 120, through the PS communication channel, 161, provided between the UE, 100 and the BSS, 112, and further via the SGSN, 114 and GCSN, 116, node, over which data may be sent between either party UE 100 and data object server 130.

According to one aspect of the present invention a data object server, 130, includes graphical information objects, i.e., phonepages, associated to a telephone number. The telephone number is identical to a subscriber number, i.e., an A- or B-number, addressing an originating user equipment or a terminating user equipment, respectively. The A-party, upon dialing a B-number, connects to a data object server, 130, by way of PS communication channel and receives a data object, i.e., a "phonepage" stored in a memory position in the data object server, with a memory address corresponding to the B-number dialed. The phonepage may consist of information about the B-party, or it may simply provide an immediate access to an internal or external data network as maintained by the B-party subscriber. Alternatively, the B-party phonepage may consist of information regarding a B-party user, e.g., phone number, address and other information. After having received the B-party phonepage, one or several procedures may follow. If the B-number is addressing a POT, 150, a circuit switched voice connection may be setup. If the B-number is addressing another device, other events may occur. This is of course also dependent upon the A-party device, UE, 100, used.

In a variant of the present invention, the UE, 100, does not support the use of a PS communication channel whereby data objects can be retrieved by other means, such as a Short Message Service (SMS) or a temporary CS communication channel. In a variant of the present invention, a PS communication channel, for example having a particular QoS, is used for conveying speech within the communication system 10 whereby the PSTN, 140, and the data network, 120, is interconnected by some means (not shown in FIG. 1).

Figure 2:
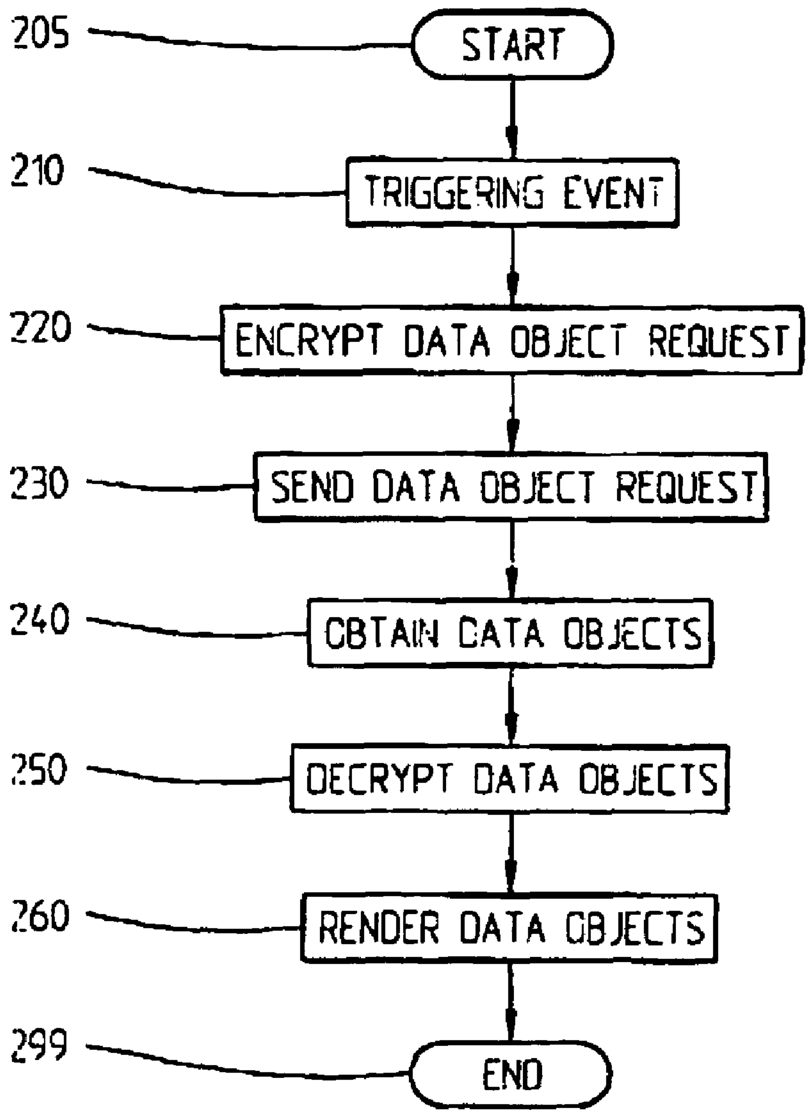
FIG. 2 illustrates a first flow diagram of a subscriber interaction in an A-party UE according to one embodiment of the present invention.

FIG. 2 illustrates a flow diagram of a procedure in a UE (like the UE, 100) for communicating a phonepage to an A-party using the UE, according to one embodiment of the present invention. In step 205, the procedure starts by an initiation from the A-party, (e.g. a UE is switched on). In step 210, a trigger of a phonepage request is indicated, either automatically (e.g., a call is terminated by the other party) or manually by the A-party (e.g., the dialing of a B-number). The triggering event, 210, may be at least one of a number of events, e.g.:

- An outgoing call is or is about to be initiated.
- An addressed B-party answers a call.
- An addressed B-party is busy.
- An addressed B-party does not answer.
- An addressed B-party rejects a call.
- An addressed B-party is unavailable (e.g., an addressed mobile phone is out of coverage).
- An incoming call is imminent or has just started.
- A conference call is or is about to be initiated.
- A call is disconnected.
- A call is conducted (under which several triggering events can be generated).
- A subscriber is put on hold.
- A new cell in the Public Land Mobile Network (PLMN) has been selected.
- The location of a subscriber has changed.
- A new PLMN operator is selected.
- A new country of registration is made.
- A UE is about to be switched off.
- A UE has been switched on.
- When a designated button on a UE is pressed.
- In response to a talk spurt received by a UE.
- A voice mail has been left to a subscriber.
- An SMS has been sent to a subscriber.

The A-party initiates a request in step 230, possibly after encryption in step 220, and sends this request via a communication channel (e.g., packet switched as illustrated in FIG. 1) to a data object server. The data object request may include at least one of a number of different parameters, e.g.:

- A requested protocol to be used for transmission (e.g., WAP, WML, HDML, HTML)
- An identification of a data object server (e.g., a server name or a plain IP address)
- A code denoting what kind of event triggered the data object request (e.g., outgoing call setup).
- The indicated B-number associated with at least one B-party equipment.
- An A-party identity, e.g., an A-number of a mobile station.
- A network address of the A-party (e.g., IP address) used by the data object server when returning a requested data object.
- A capability code indicating the displaying capabilities of the A-patty (e.g., screen resolution, audio etc.)
- A code indicating an encryption scheme or encryption key used.
- A code indicating in what country the mobile station is registered (country code).
- A code identifying the current PLMN (V-PLMN) operator or the PLMN where the A-party has a subscription (H-PLMN) or both.
- A code indicating the vendor of the mobile station and the type of the mobile station.
- A code indicating an equipment unique identity.
- A validation code (e.g., a checksum) of the parameters.

The data object request in 230 may, according to a variant of the invention, be answered by the data object server in an encrypted format, in which case a decryption in step 250 follows the reception of the response in the user equipment.

In the next step follows a rendering procedure in step 260, where the data objects are displayed according to the capability of the UE after which the procedure is ended in step 299. Typically after step 299, there will follow one or several procedures according to the capability of the A-party UE or the type of equipment addressed by a B-number. For example, a call may be setup or a call may be disconnected. According to one of the above mentioned embodiments, where a continuous triggering event is that a call is conducted, special advantages may be relevant (e.g., commercial information may be sold in response to a dialed B-number allowing easy payment for such information).

Figure 3:
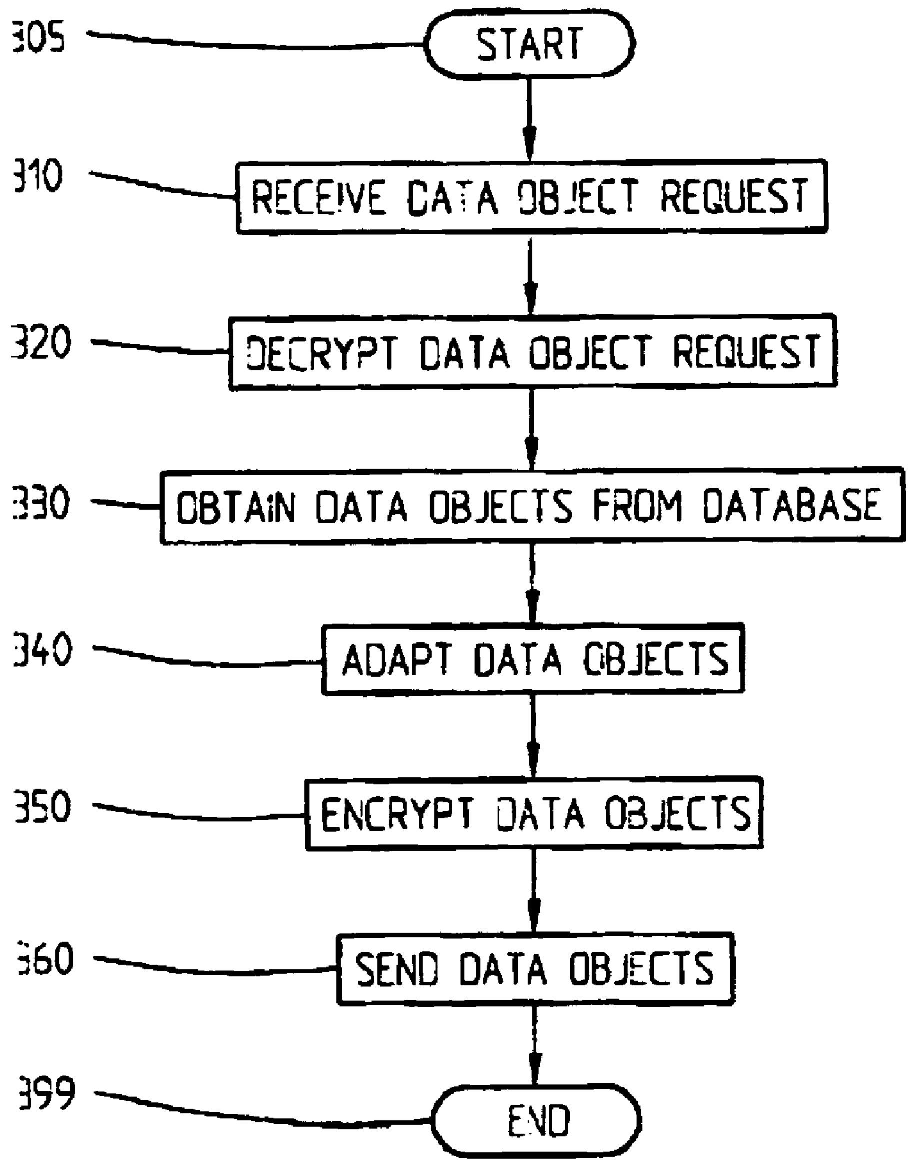
FIG. 3 illustrates a first flow diagram of a subscriber interaction in a data server according to one embodiment of the present invention.

FIG. 3 illustrates the corresponding procedures in a data object server (like the data object server 130), wherein, in step 305, the procedure starts and in step 310, the data object server receives a request for a data object. The request may typically include at least an indication corresponding to an A- or B-number and what kind of action triggered the request. If the request is encrypted, decryption will be made in step 320, before interpreting the content. The address indication (e.g. A- or B-number) in the request received in step 310 will be mapped with a memory address in the data object server, or to an address in the data object server, connected memory and the data object, i.e., phonepage will be retrieved in step 330. The request in step 310 may also include an indication of a UE display capability, in which case the data object may be adapted in the data object server to a specific rendering capability, step 340, of a receiving UE. If the request was encrypted, or if requested for some other reason, the data object will be encrypted in step 350 before it is returned to the requesting UE, in step 360 and then the procedure is ended in the data object server in step 399.

The above described general solution to obtain a data object connected to an address indication may of course be varied in a number of different ways, depending on, e.g., the capabilities of communication of the UEs involved. For example, a method of simultaneously requesting, encrypting, obtaining, decrypting and rendering a sequence of data objects can also be applied in a variant of the present invention.

User equipment, like mobile stations, are today developed to handle both packet switched and circuit switched communication simultaneously. These are generally referred to as class A mobile stations. Other mobile station designs allow packet switched and circuit switched communication alternatively, i.e., no simultaneous PS and CS transmission and reception. These are generally referred to as class B mobile stations.

Figure 4:
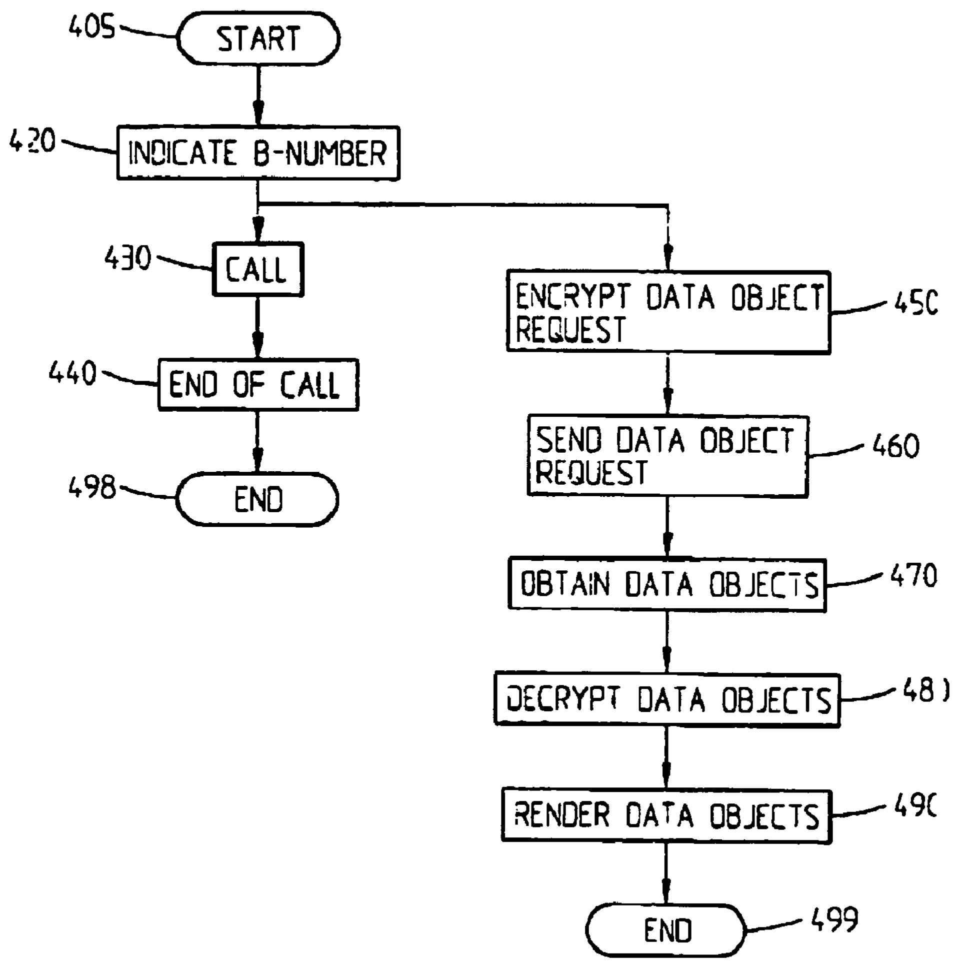
FIG. 4 illustrates a second flow diagram of a subscriber interaction in an A-party UE according to an embodiment of the present invention, when data and voice communications can be conducted simultaneously.

In FIG. 4 is illustrated a flow diagram of procedures included when a circuit switched connection is initiated from a UE which Is a class A mobile station according to one aspect of the present invention. In step 405, the procedure is started when a class A mobile station is not involved in a call session and when a user, e.g., starts to indicate a B-number to a B-party, step 420, by pressing a digit, a button or by activating voice recognition means. During step 420 the entire B-number is obtained. The mobile station now starts to set up two different connections, a circuit switched connection for a voice communication channel in step 430–440–498, and a packet switched communication channel for retrieval of a phonepage in step 450–499. These procedures may in a class A mobile station be simultaneous.

For the circuit switched procedures, a voice connection with a B-party is initiated in step 430, a communication recourse is assigned by a mobile network over which a telephone conversation may take place. The telephone conversation is ended in step 440 as any ordinary voice call, for example by pressing a designated button on the mobile station or hanging up a handheld part of a fixed network telephone. Ending the call also involves de-allocation of relevant communication resources within the circuit switched part of the mobile communication network as well as, e.g., any PSTN resources involved in the connection.

The packet switched procedures basically follow the procedures described in connection to FIG. 3, where a data object request is sent, possibly after encryption, steps 450 and 460 and a response is received and the phonepage displayed, possibly after proper decryption thereof, steps 470–490, after which the packet switched connection also ends, in step 499.

As mentioned above, a class B type mobile station cannot handle two simultaneous connections, one packet and one circuit switched, so another approach to retrieve a phonepage is then necessary when setting up a circuit switched voice connection.

Figure 5:
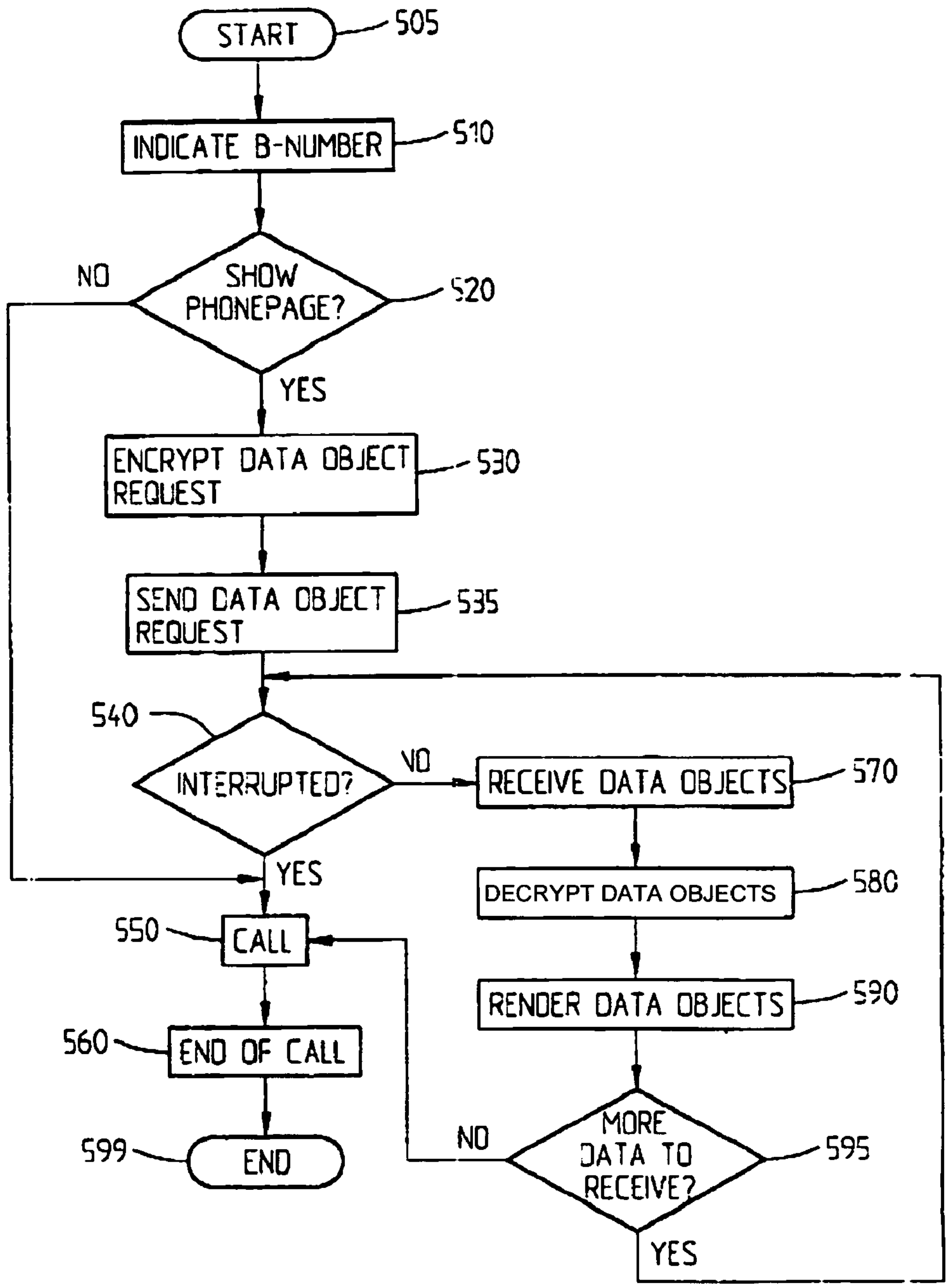
FIG. 5 illustrates a third flow diagram of a subscriber interaction in an A-party UE according to another embodiment of the present invention, when data and voice communications can not be conducted simultaneously.

FIG. 5 illustrates a similar procedure to that explained with reference to FIG. 4, but with a mobile station of a class B type used in the A-party, call originating end. In step 505 the procedure starts and in step 510, the B-number is indicated as described above in reference to FIG. 4. In this embodiment, a step 520 is introduced where it is possible to select if a phonepage is to be requested or not. This can typically be a selection made by the user, and/or indicated by the B-number dialed by appropriate setting. According to one embodiment of the current invention double clicking on a designated SEND button indicates that the phone page is to be requested. If it is indicated that a phonepage is not desired, then follows in step 550–560 and 599 a circuit switched call connection and termination as explained in relation to FIG. 4, steps 430, 440 and 498.

If it is indicated that a phonepage is desired, then the following steps are to encrypt, 530, and send, 535, a data object request on a packet switched communication channel. As long as the packet session is not interrupted, 540, the download of data object continues to the A-party. Data objects are received in step 570, decrypted, if encrypted, in step 580 and rendered in step 590. In step 595 the data objects are detected and as long as there is more information to receive, step 595, and there are no interruptions in step 540, the data download continues. A possible interrupt may occur, e.g., when a user wishes to no longer wait for a complete download of a phonepage and instead initiates the circuit switched communication in step 550. This may be initiated by a time expiring or by manually indicating this on a man-machine interface (MMI). At the latest, the circuit switched communication is initiated when there is no more phonepage data to download. According to another embodiment of the present invention the phonepages for a class B UE are obtained from the data object server, 130, upon call completion or whenever the UE is not involved in a call, and are stored locally in the UE being readily available upon a next triggering event.

Figure 6:
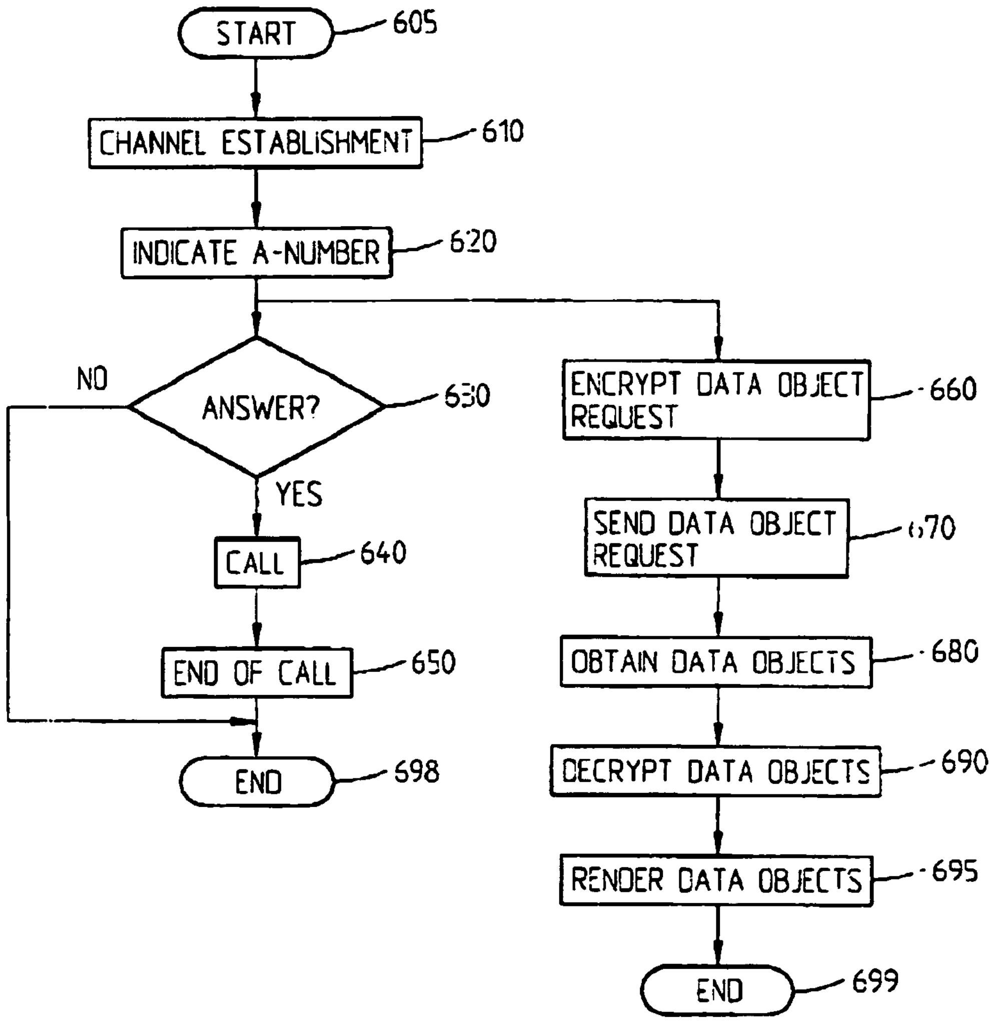
FIG. 6 illustrates a flow diagram of a subscriber interaction in a B-party UE according to an embodiment of the present invention.

So far, the retrieval of phonepages to display in A-party equipment has been addressed. It should be recognized that a B-party may similarly also display a phonepage related to a connection, preferably a phonepage identified with the A-party number. In FIG. 6 is illustrated a flow diagram of the procedures in B-party user equipment for retrieval of A-party phonepages according to one embodiment of the present invention when the B-party has the capabilities corresponding to that of a class A mobile station. The procedure start in step 605, e.g., by an incoming call to a B-party UE. In step 610 a communication channel is allocated between the UE and the network, 110, it is connected to. In step 620 an indication of the call originating identity, i.e., the A-party identity, preferably, an A-number, is revealed to the B-party. Then in step 660 and 670, a request is sent, subsequent to encryption thereof, to a data object server. The request is, when received in the server, treated similar as the requests received from the A-party, i.e., decrypted if necessary, and responded to in transmission of a data object related w the A-party identity. The UE receives the data objects, i.e., phonepage in step 680 and after decryption in step 690, if necessary, the phonepage can be displayed to the B-party user in step 695.

If the call is answered in 630, the voice connection may follow the same procedures as those described in relation to FIGS. 3 and 4. If the call is not answered the voice part sequence ends in 698.

For reasons of clarification, several steps in the signaling between the UE 100 and the communication infrastructure 110; between the UE 100 and the data object server 130; have been omitted, in several embodiments above, and focus has been put on the necessary and novel steps according to the invention, in the aforementioned signaling. It should be understood that other procedures (e.g., authentication, channel assignment and charging) might occur in addition to what has been described in the aforementioned signaling.

Figure 7:
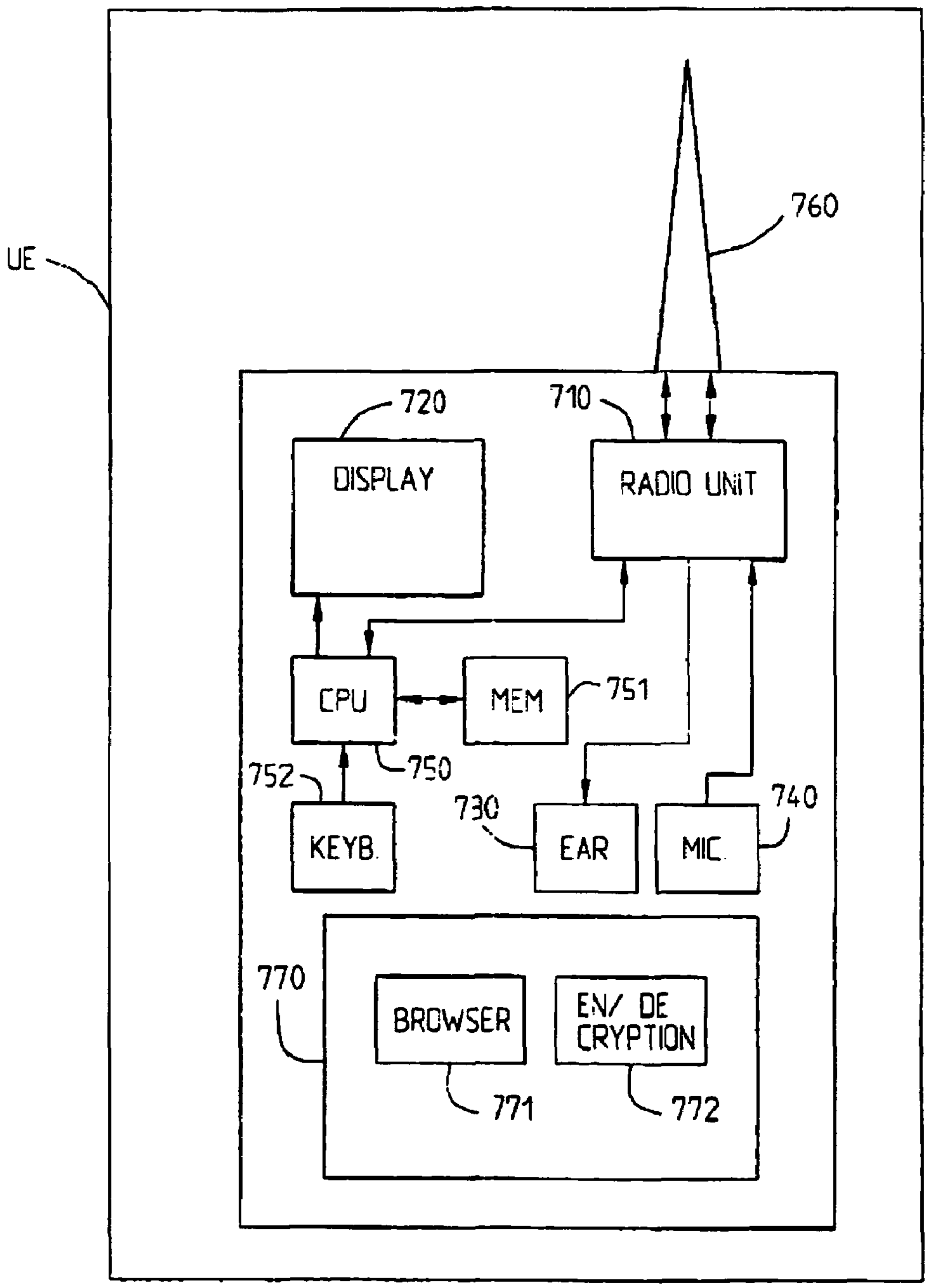
FIG. 7 illustrates an exemplary block diagram of a UE according to one embodiment of the invention.

FIG. 7 illustrates a UE according to be used in one embodiment of the present invention, where the UE is a mobile telephone or a PDA with mobile telephone capabilities. A Central Processing Unit (hereafter CPU) 750 is connected to at least one memory unit 751, and at least one display 720. The CPU 750 may also be connected to a keyboard device or area 752 to allow subscribers to enter, for example, digits. The memory unit 751 may be non-volatile (e.g. EEPROM or SIM card) in order to retain stored information, should power be temporarily unavailable. The CPU 750 is further connected to a radio unit 710 that may convert incoming and outgoing data to RF modulated signals. The radio unit 710 also connects to an antenna 760 allowing the RE modulated signals to be received/transmitted to an RF compatible media (e.g., air). The radio unit 710 may also directly or indirectly be connected to an earphone 730 and a microphone 740 in order to allow voice communication. The UE may further comprise a plurality of programs 770, e.g., a browser, 771, that can render at least one type of data object and an encryption/decryption engine 772 allowing data object requests to be encrypted and data objects to be decrypted. The UE may optionally be equipped with a cache memory in which it is possible to store and retrieve data objects without occupying transmission resources within the communication network 10.

Figure 8:
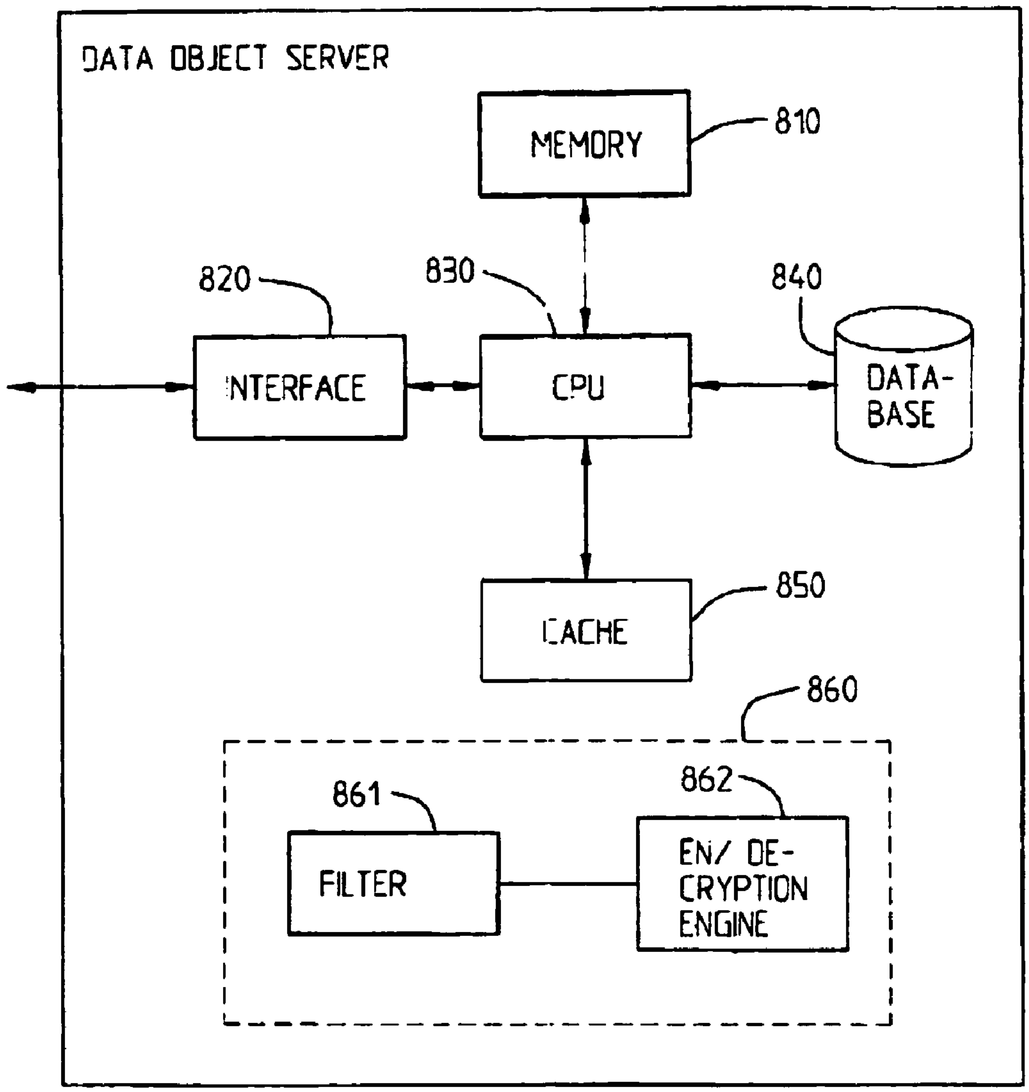
FIG. 8 illustrates a block diagram of a data object server in a data network according to one embodiment of the invention.

FIG. 8 illustrates a data object server 130, according to one embodiment of the present invention. The data object server comprises at least one CPU 830 connected to at least one memory device 810, a cache memory 850, at least one database 840 and at least one interface 820. Memory devices 810 and databases 840 may be non-volatile. The interface 820 enables the CPU 830 to send and receive data to/from the data network 120. The cache memory 850 allows storage of frequently used data objects so that the CPU 830 may obtain them readily. The database 840 contains the actual data objects that can be requested by the UE 100 via a communication infrastructure 110 and a data network 120. The data object server may also further comprise a number of programs 860 including, but not limited to, a filter 861 allowing the data objects to be optimized according to the rendering capabilities of the UE 100; and an encryption/decryption engine 862 allowing data object requests to be decrypted and data objects to be encrypted.

According to a variant of the invention the blocks 810, 820, 830 840, 850 and 860 may be implemented on a plurality of computers. According to another variant of the present invention, the said plurality of computers may be located at a substantial distance.

Figure 9:
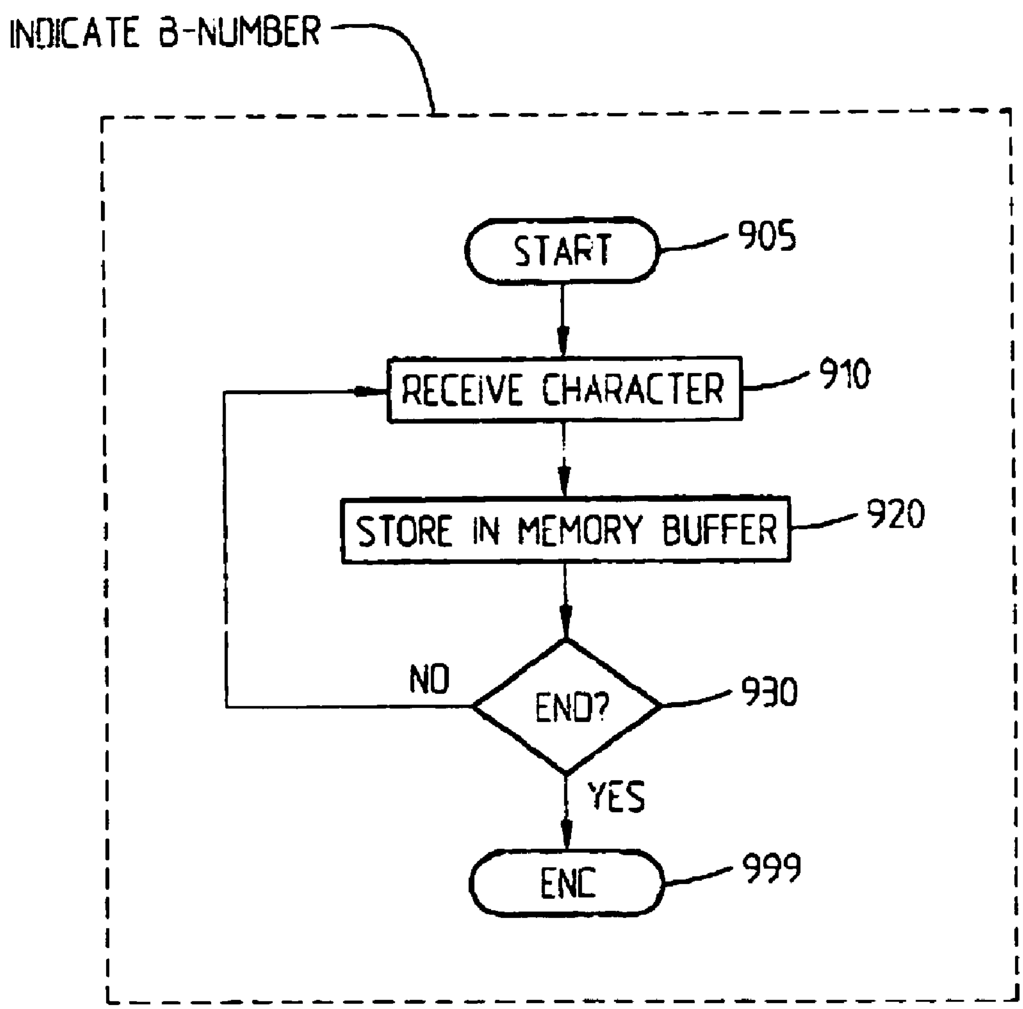
FIG. 9 illustrates a flow diagram of B-number indication procedure according to one embodiment of the present invention.

B-number indication involves any means of indicating a B-number in an A-party UE. A first example of B-number indication procedure is described with reference to FIG. 9 where the B-number indication comprises a start step at 905 and the step 910 of receiving a character from a keyboard arrangement. In response to step 910, the character is stored in a memory buffer in the UE in step 920 and it is checked if the B-number is complete in step 930. If the number is incomplete steps 910, 920 and 930 are repeated. If the B-number is complete the B-number indication procedure is concluded in 999. Determination of B-number completion 930 may or may not involve the use of timers supervising the indication procedure; a short key combination in order to minimize the number of keys pressed; designated buttons to indicate number completion (e.g., pressing SEND or CALL buttons once) or by analyzing the digits in the memory buffer for B-number completeness.

A second example of B-number indication is by means of voice detection whereby an incoming talk spurt is successfully matched with an entry in an internal database contained in a UE 100, whereby a valid B-number could be obtained in response to the aforementioned talk spurt.

Figure 10:
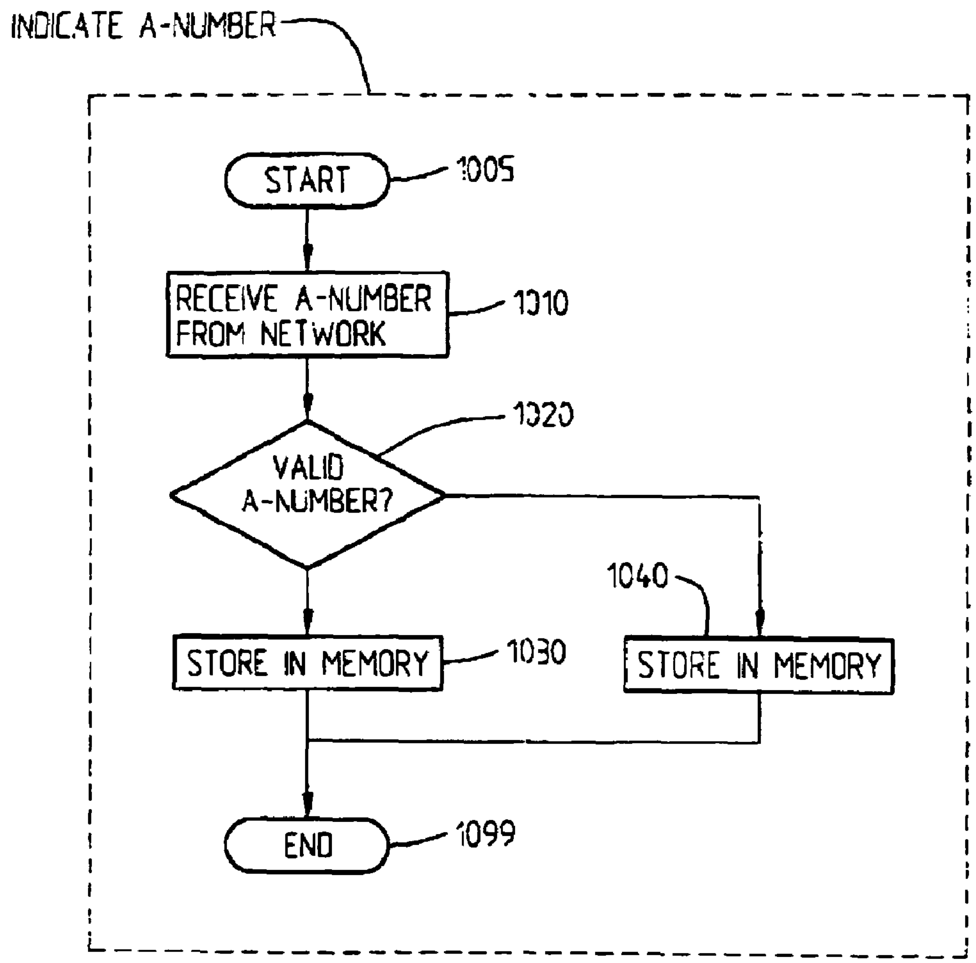
FIG. 10 illustrates a flow diagram of A-number indication procedure according to one embodiment of the present invention.

A-number indication involves any means of indicating an A-number to a said UE 100. A first example of A-number indication procedure is described with reference to FIG. 10 where the A-number indication comprises the step 1005 of starting the procedure and 1010 of receiving an A-number from a communication infrastructure 110. In response to step 1010 the A-number is checked if it was valid (e.g., not blocked, secret or misinterpreted) and if it was valid, the A-number is stored in a memory in the UE 100 in step 1030. If the A-number was not valid a flag indicating a non valid A number is stored in a memory of UE 100 at 1040. The procedure is ended in 1099.

A second example of A-number indication is by means of sending an A-number or data objects in response to an A-number directly on a logical data communication link 161.

Figure 11:
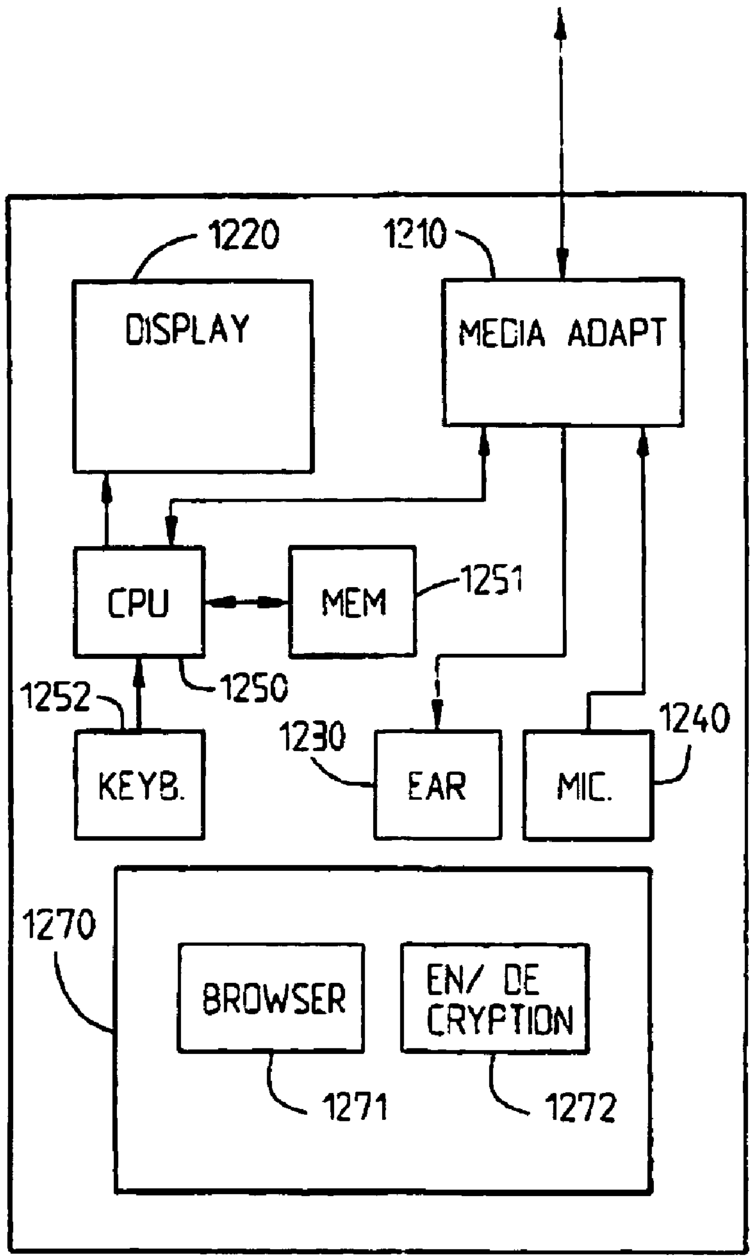
FIG. 11 illustrates an exemplary block diagram of a UE where the UE is connected to a fixed network according to one embodiment of the invention.

FIG. 11 illustrates a UE 100 according to a second variant of the invention when the UE 100 is a fixed telephone with graphic capabilities. According to this second variant, the UE 100 is equal to a mobile telephone as described in FIG. 7 but with the exception that the radio unit 710 and antenna 760 are replaced with a media adapter 1210 that converts incoming and outgoing signals to and from a particular media standard including but not limited to ISDN, ADSL, HDSL, VDSL and Cable networks and any combination thereof.

Figure 12:
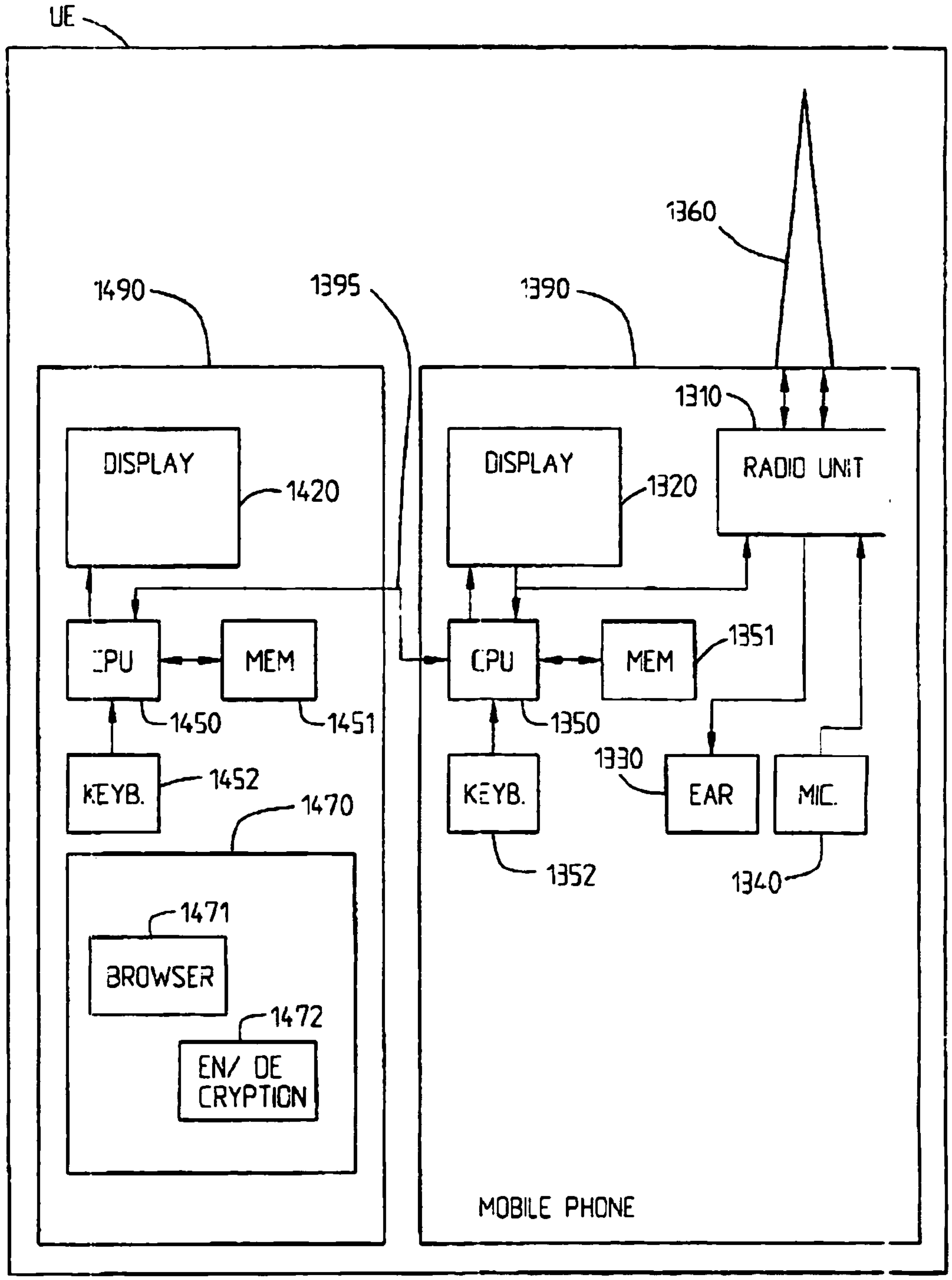
FIG. 12 illustrates an exemplary block diagram of a UE where the UE consists of a PDA and a mobile phone according to one embodiment of the invention.

FIG. 12 illustrates a UE 100 according to another embodiment of The invention when the UE 100 is a mobile telephone 1390 possibly without data object rendering capabilities, with an antenna 1360; connected to a PDA 1490 via a communication link 1395. The communication link may for example be realized with an infrared, radio (e.g., Bluetooth) or wire communication arrangement. The PDA 1490 further comprises a CPU 1450 connected to at least one memory unit 1451, and at least one display 1420. The CPU 1350 may also be connected to a keyboard device or area 1452 to allow subscribers to enter, for example, digits. The memory unit 1451 may be non-volatile (e.g., EEPROM or SIM card) in order to retain stored information, should power be temporarily unavailable. The PDA 1490 further comprises a collection of programs 1470 including but not limited to a browser 1471 that can render at least one type of data object and an encryption/decryption engine 1472 allowing data object requests to be encrypted and data objects to be decrypted. The mobile phone 1390 is further described in FIG. 7 where 1320 corresponds to 720, 1310 corresponds to 710, 1350 corresponds to 750, 1351 corresponds to 751, 1352 corresponds to 752, 1330 corresponds to 730 and 1340 corresponds to 740.

What is claimed is:

1. A method of retrieving an object in a first user equipment connectable via a first communication channel with a second user equipment, wherein the method comprises the following steps:

acquiring an address indication;

determining the occurrence of a triggering event;

assembling a request for an object associated with the address indication, the request comprising at least two parameters, a first parameter representing the acquired address indication and a second parameter representing the determined triggering event;

sending the request for the object via a second communication channel to a data object server;

receiving the data object or an indication of the object from the data object server in view of the parameters;

processing the received object or indication of the object.

2. The method according to claim 1, wherein the first communication channel and the second communication channel are concurrent communication channels.

3. The method according to claim 1, wherein the first communication channel and the second communication channel are non-concurrent communication channels.

4. The method according to claim 1, wherein the first communication channel is a circuit switched communication and the second communication channel is a circuit switched communication channel.

5. The method according to claim 1, wherein the first communication channel is a circuit switched communication channel and the second communication channel is a packet switched communication channel.

6. The method according to claim 1, wherein the first communication channel is a packet switched communication channel and the second communication channel is a packet switched communication channel.

7. The method according to claim 1, wherein the address indication is a telephone number of the first user equipment.

8. The method according to claim 1, wherein the address indication is a telephone number of the second user equipment.

9. The method according to claim 1, wherein the first user equipment is an originating user equipment and the second user equipment is a terminating user equipment.

10. The method according to claim 1, wherein the second user equipment is a originating user equipment and the first user equipment is a terminating user equipment.

11. The method according to claim 1, wherein a parameter of the request is a representation of a capability of the first user equipment.

12. The method according to claim 11, wherein the data object is displayed according to the capability of the first user equipment.

13. The method according to claim 1, wherein the request is encrypted before sending.

14. The method according to claim 1, wherein the received data object is encrypted and in that the step of processing comprises decryption of the data object.

15. The method according to claim 1, wherein the triggering event is an event of an outgoing call being or is about to be initiated.

16. The method according to claim 1, wherein the triggering event is an event of a completeness of the address indication by analysis.

17. The method according to claim 1, wherein the triggering event is an event of a completeness of the address indication by a designated button.

18. The method according to claim 1, wherein the triggering event is an event of an addressed called party answering a call.

19. The method according to claim 1, wherein the triggering event is an event of an addressed called party being busy.

20. The method according to claim 1, wherein the triggering event is an event of an addressed called party not answering.

21. The method according to claim 1, wherein a triggering event is an event of an addressed called party rejecting a call.

22. The method according to claim 1, wherein a triggering event is an event of an addressed called party being unavailable.

23. The method according to claim 22, wherein the triggering event of an addressed called party being unavailable is an addressed mobile phone being out of coverage.

24. The method according to claim 1, wherein a triggering event is an event of an incoming call being imminent or having just started.

25. The method according to claim 1, wherein a triggering event is an event of a conference call being or is about to be initiated.

26. The method according to claim 1, wherein a triggering event is an event of a call being disconnected.

27. The method according to claim 1, wherein a triggering event is an event of a call being conducted.

28. The method according to claim 27, wherein the triggering event of a call being conducted can generate several triggering events during the call.

29. The method according to claim 28, wherein commercial information is sold by calling a telephone number and the several triggering events are used for payment of the information.

30. The method according to claim 1, wherein the triggering event is an event of a subscriber being put on hold.

31. The method according to claim 1, wherein the triggering event is an event of a new cell in the public land mobile network having been selected.

32. The method according to claim 1, wherein the triggering event is an event of a location of a subscriber having changed.

33. The method according to claim 1, wherein the triggering event is an event of a new public land mobile network operator being selected.

34. The method according to claim 1, wherein the triggering event is an event of a new country of registration being made.

35. The method according to claim 1, wherein the triggering event is an event of a user equipment being about to be switched off.

36. The method according to claim 1, wherein the triggering event is an event of a user equipment having been switched on.

37. The method according to claim 1, wherein the triggering event is an event of a designated button on a user equipment being pressed.

38. The method according to claim 1, wherein the triggering event is in response to a talk spurt received by a user equipment.

39. The method according to claim 1, wherein the triggering event is an event of a voice mail having been left to a subscriber.

40. The method according to claim 1, wherein the triggering event is an event of an SMS having been sent to a subscriber.

41. The method according to claim 1, wherein the at least two parameters further comprise a parameter representing a requested protocol to be used for transmission.

42. The method according to claim 41, wherein the parameter representing a requested protocol to be used for transmission represents either WAP, WML, HDML, or HTML.

43. The method according to claim 1, wherein the at least two parameters further comprise a parameter representing an identification of a data object server.

44. The method according to claim 43, wherein the parameter representing an identification of a data object server represents a server name or a plain IP address.

45. The method according to claim 1, wherein the at least two parameters further comprise a parameter representing a code denoting what kind of event that triggered the data object request.

46. The method according to claim 45, wherein the parameter representing a code denoting what kind of event that triggered the data object request represents an outgoing call setup.

47. The method according to claim 1, wherein the at least two parameters further comprise a parameter representing an indicated called number associated to at least one terminating patty user equipment.

48. The method according to claim 1, wherein the at least two parameters further comprise a parameter representing a caller identity.

49. The method according to claim 48, wherein the parameter representing a caller party identity represents a caller number of a mobile station.

50. The method according to claim 1, wherein the at least two parameters further comprise a parameter representing a network address of a caller party used by the data object server when returning a requested data object.

51. The method according to claim 50, wherein the parameter representing a network address of the caller party used by the data object server when returning a requested data object, represents an IP address.

52. The method according to claim 1, wherein the at least two parameters further comprise a parameter representing a capability code indicating the displaying capabilities of the caller party.

53. The method according to claim 52, wherein the parameter representing a capability code indicating the displaying capabilities of the originating party represents screen resolution and/or audio capability.

54. The method according to claim 1, wherein the at least two parameters further comprise a parameter representing a code indicating an encryption scheme or encryption key used.

55. The method according to claim 1, wherein the at least two parameters further comprise a parameter representing a code indicating in what country a mobile station is registered.

56. The method according to claim 1, wherein the at least two parameters further comprise a parameter representing a code identifying a current public land mobile network operator or a public land mobile network where a originating party has a subscription or both.

57. The method according to claim 1, wherein the at least two parameters further comprise a parameter representing a code indicating a vendor of a mobile station and a type of mobile station.

58. The method according to claim 1, wherein the at least two parameters further comprise a parameter representing a code indicating an equipment unique identity.

59. The method according to claim 1, wherein the at least two parameters further comprise a parameter representing a validation code of the parameters.

60. The method according to claim 59, wherein the parameter representing a validation code of the parameters represents a checksum.

61. The method according to claim 1, wherein whenever the first user equipment is not involved in a call or upon call completion, obtaining data objects from the data object server and storing them locally in the first user equipment to be readily available upon the next triggering event.

62. A fixed telephone comprising graphic possibilities, wherein the telephone executes the method according to claim 1.

63. A mobile telephone comprising a central processing unit, a memory unit, and at least one display, wherein the mobile telephone executes the method according to claim 1.

64. A data equipment comprising a central processing unit, a memory unit, and at least one display, such as a personal digital assistance device or a laptop computer, having mobile telephone capabilities or being connected to a mobile telephone, wherein the data equipment executes the method according to claim 1.

65. A telecommunication system comprising a first user equipment, a second user equipment, and a communication network to establish a first communication channel between the first user equipment and the second user equipment, and a data object server, wherein the first user equipment is arranged to acquire an address indication, determine the occurrence of a triggering event, and assemble a request of an object associated with the address indication, the request comprising at least two parameters, a first parameter representing the acquired address indication and a second parameter representing the determined triggering event, and is arranged to send the request of an object via a second communication channel to the data object server, and in that the data object server is arranged to return the data object or an indication of the data object in view of the parameters to the first user equipment via the second communication channel in response to the request and in that the first user equipment is arranged to receive the data object or the indication of the data object from the data object server and to then process the received data object or the indication of the data object.

66. The telecommunication system according to claim 65, wherein the first communication channel and the second communication channel are concurrent communication channels.

67. The telecommunication system according to claim 65, wherein the first communication channel and the second communication channel are non-concurrent communication channels.

68. The telecommunication system according to claim 65, wherein the first communication channel is a circuit switched communication channel and the second communication channel is a circuit switched communication channel.

69. The telecommunication system according to claim 65, wherein the first communication channel is a circuit switched communication channel and the second communication channel is a packet switched communication channel.

70. The telecommunication system according to claim 65, wherein the first communication channel is a packet switched communication channel and the second communication channel is a packet switched communication channel.

71. The telecommunication system according to claim 65, wherein the address indication is a telephone number of the first user equipment.

72. The telecommunication system according to claim 65, wherein the address indication is a telephone number of the second user equipment.

73. The telecommunication system according to claim 65, wherein the first user equipment is an originating user equipment and the second user equipment is a terminating user equipment.

74. The telecommunication system according to claim 65, wherein the second user equipment is an originating user equipment and the first user equipment is a terminating user equipment.

75. The telecommunication system according to claim 65, wherein a parameter of the request is the capability of the first user equipment.

76. The telecommunication system according to claim 75, wherein the data objects are displayed according to the capability of the first user equipment.

77. The telecommunication system according to claim 65, wherein the first user equipment is arranged to encrypt the request before sending it and in that the data object server is arranged to decrypt the received request.

78. The telecommunication system according to claim 65, wherein the data object server is arranged to encrypt the one or more data objects to be returned to the first user equipment and in that the first user equipment is arranged to decrypt the received one or more data objects.

79. The telecommunication system according to claim 65, wherein the triggering event is an event of an outgoing call being or is about to be initiated.

80. The telecommunication system according to claim 65, wherein the triggering event is an event of a completeness of the address indication by analysis.

81. The telecommunication system according to claim 65, wherein the triggering event is an event of a completeness of the address indication by a designated button.

82. The telecommunication system according to claim 65, wherein the triggering event is an event of an addressed called party answering a call.

83. The telecommunication system according to claim 65, wherein the triggering event is an event of an addressed called party being busy.

84. The telecommunication system according to claim 65, wherein the triggering event is an event of an addressed called party not answering.

85. The telecommunication system according to claim 65, wherein a triggering event is an event of an addressed called party rejecting a call.

86. The telecommunication system according to claim 65, wherein a triggering event is an event of an addressed called party being unavailable.

87. The telecommunication system according to claim 86, wherein the triggering event of an addressed called party being unavailable is an addressed mobile phone being out of coverage.

88. The telecommunication system according to claim 65, wherein a triggering event is an event of an incoming call being imminent or having just started.

89. The telecommunication system according to claim 65, wherein a triggering event is an event of a conference call being or is about to be initiated.

90. The telecommunication system according to claim 65, wherein a triggering event is an event of a call being disconnected.

91. The telecommunication system according to claim 65, wherein a triggering event is an event of a call being conducted.

92. The telecommunication system according to claim 91, wherein the triggering event of a call being conducted can generate several triggering events during the call.

93. The telecommunication system according to claim 92, wherein commercial information is sold by calling a telephone number and the several triggering events are used for payment of the information.

94. The telecommunication system according to claim 65, wherein the triggering event is an event of a subscriber being put on hold.

95. The telecommunication system according to claim 65, wherein the triggering event is an event of a new cell in the public land mobile network having been selected.

96. The telecommunication system according to claim 65, wherein the triggering event is an event of a location of a subscriber having changed.

97. The telecommunication system according to claim 65, wherein the triggering event is an event of a new public land mobile network operator being selected.

98. The telecommunication system according to claim 65, wherein the triggering event is an event of a new country of registration being made.

99. The telecommunication system according to claim 65, wherein the triggering event is an event of a user equipment being about to be switched off.

100. The telecommunication system according to claim 65, wherein the triggering event is an event of a user equipment having been switched on.

101. The telecommunication system according to claim 65, wherein the triggering event is an event of a designated button on a user equipment being pressed.

102. The telecommunication system according to claim 65, wherein the triggering event is in response to a talk spurt received by a user equipment.

103. The telecommunication system according to claim 65, wherein the triggering event is an event of a voice mail having been left to a subscriber.

104. The telecommunication system according to claim 65, wherein the triggering event is an event of an SMS having been sent to a subscriber.

105. The telecommunication system according to claim 65, wherein the at least two parameters further comprise a parameter representing a requested protocol to be used for transmission.

106. The telecommunication system according to claim 105, wherein the parameter representing a requested protocol to be used for transmission represents either WAP, WML, HDML, or HTML.

107. The telecommunication system according to claim 65, wherein the at least two parameters further comprise a parameter representing an identification of a data object server.

108. The telecommunication system according to claim 107, wherein the parameter representing an identification of a data object server represents a server name or a plain IP address.

109. The telecommunication system according to claim 65, wherein the at least two parameters further comprise a parameter representing a code denoting what kind of event that triggered the data object request.

110. The telecommunication system according to claim 109, wherein the parameter representing a code denoting what kind of event that triggered the data object request represents an outgoing call setup.

111. The telecommunication system according to claim 65, wherein the at least two parameters further comprise a parameter representing an indicated called number associated to at least one terminating party user equipment.

112. The telecommunication system according to claim 65, wherein the at least two parameters further comprise a parameter representing a caller identity.

113. The telecommunication system according to claim 112, wherein the parameter representing a caller party identity represents a caller number of a mobile station.

114. The telecommunication system according to claim 65, wherein the at least two parameters further comprise a parameter representing a network address of a caller party used by the data object server when returning a requested data object.

115. The telecommunication system according to claim 114, wherein the parameter representing a network address of the caller party used by the data object server when returning a requested data object, represents an IP address.

116. The telecommunication system according to claim 65, wherein the at least two parameters further comprise a parameter representing a capability code indicating the displaying capabilities of the caller party.

117. The telecommunication system according to claim 116, wherein the parameter representing a capability code indicating the displaying capabilities of the originating party represents screen resolution and/or audio capability.

118. The telecommunication system according to claim 65, wherein the at least two parameters further comprise a parameter representing a code indicating an encryption scheme or encryption key used.

119. The telecommunication system according to claim 65, wherein the at least two parameters further comprise a parameter representing a code indicating in what country a mobile station is registered.

120. The telecommunication system according to claim 65, wherein the at least two parameters further comprise a parameter representing a code identifying a current public land mobile network operator or a public land mobile network where a originating party has a subscription or both.

121. The telecommunication system according to claim 65, wherein the at least two parameters further comprise a parameter representing a code indicating a vendor of a mobile station and a type of the mobile station.

122. The telecommunication system according to claim 65, wherein the at least two parameters further comprise a parameter representing a code indicating an equipment unique identity.

123. The telecommunication system according to claim 65, wherein the at least two parameters further comprise a parameter representing a validation code of the parameters.

124. The telecommunication system according to claim 123, wherein the parameter representing a validation code of the parameters represents a checksum.

125. The telecommunication system according to claim 65, wherein the first user equipment further comprises a cache memory and in that whenever the first user equipment is arranged, when it is not involved in a call or upon call completion to obtain data objects from the data object server and store them in the cache memory to readily be available upon the next triggering event.

* * * * *